US008448173B2

(12) United States Patent
Wang

(10) Patent No.: US 8,448,173 B2
(45) Date of Patent: May 21, 2013

(54) METHOD AND APPARATUS FOR IMPLEMENTING A TRANSACTIONAL STORE SYSTEM USING A HELPER THREAD

(75) Inventor: Huayong Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 12/685,863

(22) Filed: Jan. 12, 2010

(65) Prior Publication Data

US 2010/0186015 A1  Jul. 22, 2010

(30) Foreign Application Priority Data

Jan. 22, 2009 (CN) .......................... 2009 1 0005955

(51) Int. Cl.
*G06F 9/46* (2006.01)
(52) U.S. Cl.
USPC ........... 718/101; 718/100; 718/102; 718/103; 718/108
(58) Field of Classification Search
None
See application file for complete search history.

(56) References Cited

U.S. PATENT DOCUMENTS

| 7,350,034 | B2 | 3/2008 | Shen |
| 7,395,382 | B1 | 7/2008 | Moir |
| 7,395,418 | B1* | 7/2008 | Caprioli et al. ............... 712/228 |
| 2003/0084269 | A1* | 5/2003 | Drysdale et al. ............... 712/36 |
| 2007/0022422 | A1* | 1/2007 | Tirumalai et al. ............. 718/100 |
| 2008/0162886 | A1 | 7/2008 | Saha et al. |
| 2009/0172303 | A1* | 7/2009 | Welc et al. ..................... 711/154 |

OTHER PUBLICATIONS

Sanchez et al. Implementing Signatures for Transactional Memory. [online] (Dec. 5, 2007). IEEE, pp. 1-11. Retrieved From the Internet <http://www.stanford.edu/~sanchezd/papers/2007.signatures.micro.pdf>.*
R. Yoo et al.,"Helper Transactions: Enabling Thread-Level Speculation via A Transactional Memory System." PESPMA 2008, Beijing, China, Jun. 2008, pp. 63-71.
A.-R. Adl-Tabatabai et al., "Unlocking Concurrency," ACM Queue, vol. 4, No. 10, 2006, pp. 24-33.

* cited by examiner

*Primary Examiner* — Emerson Puente
*Assistant Examiner* — Jonathan R Labud
(74) *Attorney, Agent, or Firm* — Tutunjian & Bitetto, P.C.; Preston J. Young

(57) ABSTRACT

A method, apparatus, and computer readable article of manufacture for executing a transaction by a processor apparatus that includes a plurality of hardware threads. The method includes the steps of: creating a main software thread for executing the transaction; creating a helper software thread for executing a barrier function; executing the main software thread and the helper software thread using the plurality of hardware threads; deciding whether the execution of the barrier function is required; executing the barrier function by the helper software thread; and returning to the main software thread. The step of executing the barrier function includes: stalling the main software thread; activating the helper software thread; and exiting the helper software thread in response to completion of the execution.

20 Claims, 6 Drawing Sheets

METHOD AND APPARATUS FOR IMPLEMENTING A TRANSACTIONAL STORE SYSTEM USING A HELPER THREAD

CROSS-REFERENCE TO RELATED APPLICATION

This application claims priority under 35 U.S.C. §119 from Chinese Patent Application No. 200910005955.5 filed on Jan. 22, 2009, the entire contents of which are incorporated herein by reference.

BACKGROUND OF THE INVENTION

1. Field of the Invention

The present invention relates to a transactional store system, and more particularly, to a method and apparatus for implementing a transactional store system based on using a helper thread.

2. Description of Related Art

The transaction is a concept that is widely used in the computer field. Generally, a transaction means that a plurality of instructions is executed in an atomic manner such that there is no other interposed operation during the execution. For instance, if a transaction accesses data at a memory address, the data in the address is not modified by operations other than that transaction until the transaction terminates.

The transaction can be implemented at a hardware level, for example, using processor architecture. The hardware component that supports the transaction in an architecture level is referred to as a hardware transactional memory (HTM) system. The transactional memory (TM) that is implemented by utilizing only software is referred to as software transactional memory (STM). TM described below refers to the complete transactional memory system. By employing a transactional memory system, a programmer does not need to use a lock when writing parallel programs. Thus, it is possible to improve the productive efficiency of the software.

All of the data that is accessed by a transaction, speculative data, will be temporary stored in a transactional buffer, but not be written into memory. If two transactions access the same address and at least one of them modifies data on the address, then one of the two transactions has to be rolled back and is re-executed, but the other one resumes. Such a case is referred to as a conflict. If there is no conflict, the data that is stored temporarily while the transaction terminates will be written into memory. Such an operation is referred as commit.

When the transaction accesses data, the current implementation of TM is to add a barrier before each transactional load/store instruction that requires it to access data by a compiler. The function of the barrier is to detect whether there is conflict by checking a lock table which records the permission for each memory block to be accessed by the transaction. Using the barrier function implies that the source code of the transaction is required to be re-compiled to add the barriers during compilation.

However, a programmer cannot write code to call the library functions since the function library provided by a third party does not usually contain source code. Many functions in the library are safe with respect to a transaction. Examples of this are "strcmp," compare two strings, in the C language library, and "sqrt," square root, in the C math library. Those functions cannot be called even if those functions do not contain any un-recoverable operations. Thus, not allowing those functions to be called during the execution of transactions significantly impairs productivity.

SUMMARY OF THE INVENTION

In a first aspect of the present invention, a method is provided for executing a transaction by a processor apparatus that includes a plurality of hardware threads. The method includes the steps of: creating a main software thread by the processor apparatus for executing the transaction; creating a helper software thread by the processor apparatus for executing a barrier function; executing the main software thread and the helper software thread by the processor apparatus using the plurality of hardware threads; deciding, by the processor apparatus, whether the barrier function is required to be executed when the main software thread encounters a transactional load or store operation that requires the main software thread to read or write data; executing the barrier function by the helper software thread, wherein the step of executing the barrier function includes: stalling the main software thread; activating the helper software thread to execute the barrier function; and exiting the helper software thread in response to the completion of the execution; and returning to the main software thread, thereby executing the transaction by the processor apparatus.

According to another second aspect of the present invention, a system is provided for executing a transaction by a processor apparatus that includes a plurality of simultaneous hardware threads. The system includes: means for creating a main software thread for executing the transactions; means for creating a helper software thread for executing a barrier function; means for executing the main software thread and the helper software thread by utilizing the plurality of hardware threads; means for deciding whether the barrier function is required to be executed when the main software thread encounters a transactional load or store operation that requires the main software thread to read or write data; means for executing the barrier function by the helper software thread, wherein the means for executing the barrier function includes: means for stalling the main software thread; means for activating the helper software thread to execute the barrier function; and means for exiting the helper software thread in response to the completion of the barrier function by the helper software thread; and means for returning to the main software thread.

In still another aspect of the present invention, a computer readable article of manufacture tangibly embodying computer readable instructions is provided for executing the computer implemented method.

DETAILED DESCRIPTION OF THE PREFERRED EMBODIMENTS

IBM has developed a method named Best Effort Transaction (BET). For example, see U.S. Pat. No. 7,350,034. BET can be implemented in an existing multi-processor system, for example, a symmetric multi-processor system, and has a low cost. In such a BET system, data that is accessed by a transaction during the execution of the transaction is stored by using the cache, in which the unit for reading or writing by the system in the cache is referred to as the cache line. The cache line includes an A-flag and a color-flag. The A-flag indicates whether the cache line is accessed by an uncommitted transaction. The color-flag indicates that the cache line is accessed by a specific transaction. The color-flag is valid only when the A-flag is set.

The cache line with a set A-flag is called the A-cache-line. The A-cache-line cannot be replaced. In the case for which the A-cache-line is in a shared state, the color-flag can indicate a multithread, e.g., if the cache is shared by a plurality of cores. In BET, conflict detection is based on the existing cache coherence protocol, e.g., a MESI-like snooping protocol. MESI has four cache states, i.e., modified state (M), exclusive state (E), shared state (S) and invalid state (I). The MESI coherence protocol is widely used in symmetric multiprocessing (SMP) systems.

The system architecture for implementing the present invention is described below. Starting with BET, an improved version Best Effort Large Transaction (BELT) for large transactions is presented. BELT requires supporting a simultaneous multi-thread processor apparatus. For simplicity, a processor is assumed to have two hardware threads.

Figure 1:
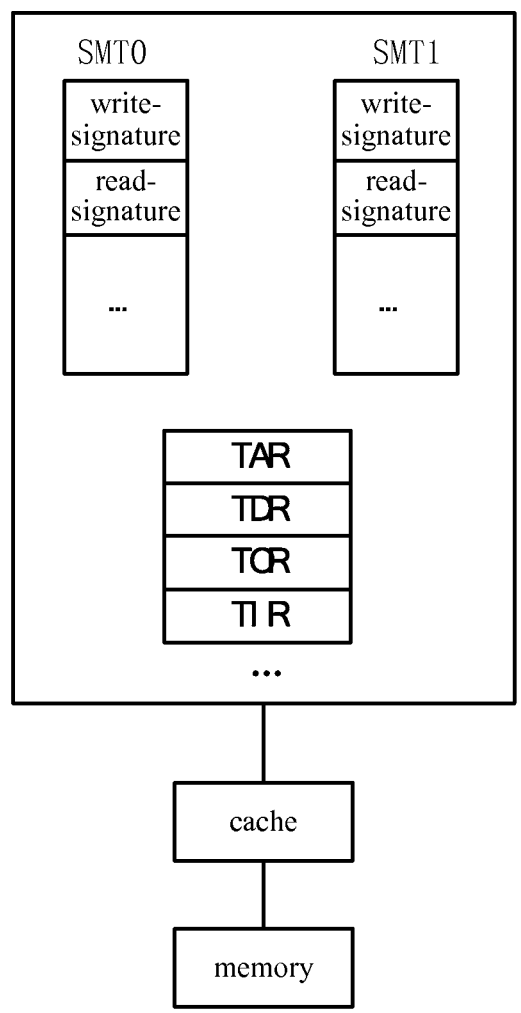
FIG. 1 depicts a simple system structure according to an embodiment of the present invention.

FIG. 1 depicts a simple system structure of an embodiment of the present invention, which has hardware threads SMT0 and SMT1. It is possible to have more than two hardware threads. Cache and memory that are accessible by the processor are included in system. The memory may store a lock table.

Preferably, each hardware thread may be augmented with a write-signature and a read-signature. These signatures are used to save the corresponding addresses of lines replaced from the cache. The term "corresponding" means that the color of the cache line is equal to the thread identification (ID). If there is no overflow, the signatures are empty. Each signature is a Bloom filter with 1K bits. The Bloom filter consists of a long binary vector and a series of random mapping functions. Its advantage is that it is fast and saves space. The signature may include the following operations:

Add an address into the signature.

Check whether an address is in the signature. If yes, it is a hit; otherwise, it is a miss.

Clear the signature and set all bits to zero.

When a transaction terminates, e.g., aborts or commits, the signatures of the hardware thread are cleared.

In FIG. 1, each processor is connected to at least four registers. These registers are accessible by all hardware threads in the processor. The registers include: Transaction Address Register (TAR), Transaction Data Register (TDR), Transaction ID Register (TIR) and Transaction Operation Register (TOR). TAR is used to save the physical address of data which is read or written by a transaction. TDR is used to save the data from a cache line. The register size is equal to the cache line size. In power architecture, it is 128 Bytes. It can be implemented by a multiple register. TIR is used to save the ID of the hardware thread that sets TOR. TOR is used to save a transaction operation code.

The code values are listed Table 1. Other registers for saving information about a transaction can also be included. In this embodiment, the TOR register has a special feature. When TOR is OP_NO, the instruction reading TOR stalls the hardware thread that executes this instruction. The stall means that the pipeline stops instruction fetching/decoding for the hardware thread and does not execute the instruction reading TOR. In Power4 and Power5 architecture, the implementation may be similar to the load instruction missing the data cache

TABLE 1

| Operation Type | Operation code | Semantics of the operation code |
| --- | --- | --- |
| Control Operation | OP_NO | No operations. |
| | OP_ABORT | Transaction aborts. TIR contains the ID of the hardware thread. |
| | OP_COMMIT | Transaction commits. TIR contains the ID of the hardware thread. |
| Data Operation | OP_READ | TAR contains the physical address of data read by a transactional load. TIR contains the ID of the hardware thread. |
| | OP_WRITE | TAR contains the physical address of data written by a transactional store. TDR contains the data. TIR contains the ID of the hardware thread. |
| | OP_OVERFLOW_READ | TAR and TIR contain the physical address and color of an A-line to be replaced. The A-line is in S or E state. |
| | OP_OVERFLOW_WRITE | TAR, TDR and TIR contain the physical address, data and color of an A-line to be replaced. The A-line is in M state. |

The instruction is rejected and reissued in a certain number of cycles and the process is repeated. The stall is cancelled when TOR is not OP_NO. Operation code is shown in Table 1. TIR is valid when TOR is not OP_NO. TAR is valid only when TOR is in data operation. TDR is valid only when TOR is OP_WRITE or OP_OVERFLOW_WRITE.

Figure 2:
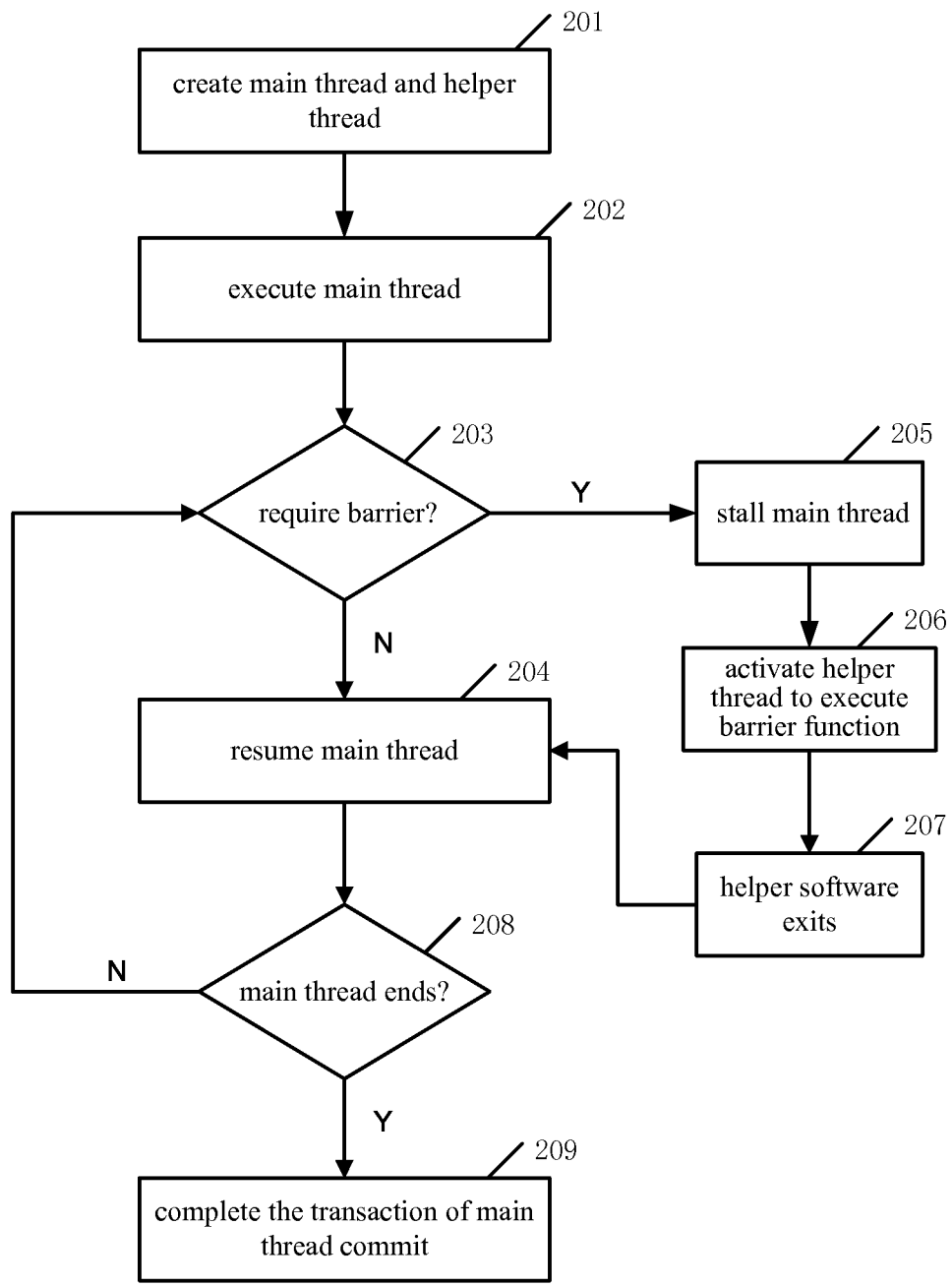
FIG. 2 depicts software implementation procedure according to an embodiment of the present invention.

FIG. 2 depicts a software implementation procedure in an embodiment of the present invention. A pair of software threads is scheduled by the two hardware threads, SMT0 and SMT1, in a processor. It is noted that it is possible to have a plurality of hardware threads as described above and it is also possible to have a plurality of software threads. Here, assume that there are only two software threads corresponding to two hardware threads.

One of the two software threads is called the main software thread, i.e., scheduled on SMT0, which is referred to as the main thread, below. It is normally used to execute transactions. The other thread is called a helper thread, i.e., scheduled on SMT1. It is used to provide services to the main thread, for example, to provide a barrier function. It is first required that the main thread and helper thread are created, step 201. The main thread and the helper thread may not be in the same process space. The design according to this embodiment, the two threads are not in the same process space. The execution of the main thread and helper thread interleaves in a coarse-grained way. That is, only one thread executes at a time.

Figure 4:
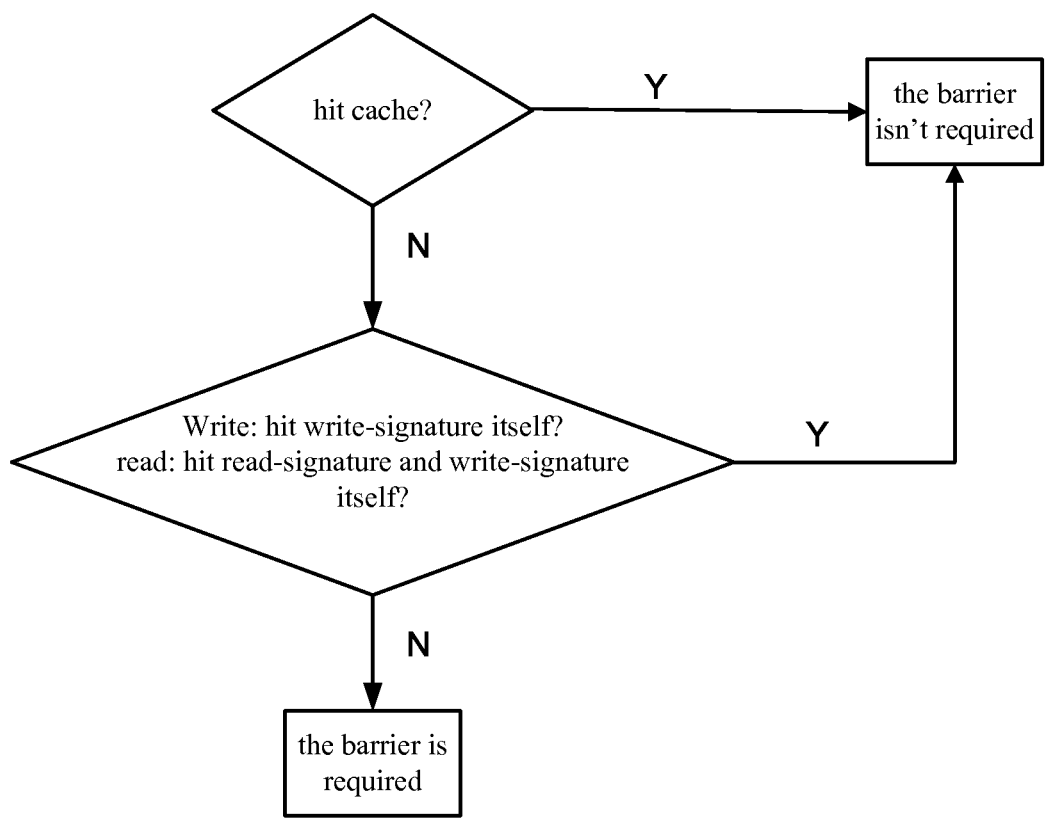
FIG. 4 depicts a detailed procedure for deciding whether the barrier function is required to be executed.

Next, the main thread is executed, step 202. During the execution of the main thread, if the main thread encounters a transactional load or store operation that requires it to read or write data, then it is decided whether the barrier function is required to be executed, step 203. FIG. 4 depicts the detailed judgment or decision procedure.

If the barrier function is required to be executed, yes in step 203, then the decision is to implement the barrier function by utilizing the coordination of a hardware multi-thread as presented in the present invention. Specifically, since only one thread executes at any given time, the main software thread is stalled, step 205. Then, the helper thread is activated to execute the barrier function, thereby implementing a switch from the main thread to the helper thread, step 206.

Figure 3:
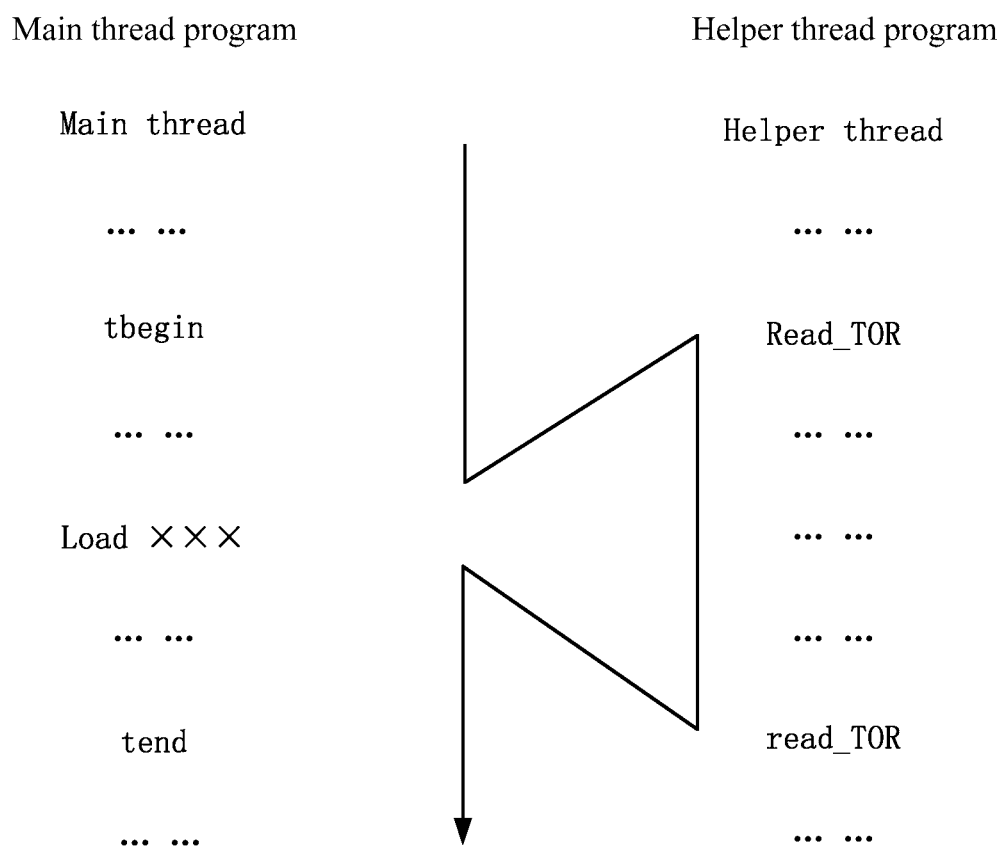
FIG. 3 depicts a process diagram of the execution of a main thread and a helper thread.

After the completion of the barrier function executed by the helper thread, the helper software exits, step 207. During the execution of the helper thread, the function of the helper thread corresponds to the function executed by the barriers in the traditional STM. After the helper thread exits, the main thread resumes, thereby implementing the switch from helper thread to main thread, step 204. If the barrier function is not required to be executed, no in step 203, then the main thread executes normally, step 204. Then, it is decided whether the main thread ends, step 208. If it does not end, no in step 208, then the process returns to step 203. If it does end, yes in step 208, the execution of the main thread terminates. FIG. 3 depicts a process diagram of the actual execution of a main thread and a helper thread.

A helper thread example is demonstrated by the following pseudo-code.

```
...
while(true)
{
    op = read_TOR; // helper thread is stalled by this instruction
    address = read_TPAR; // get the physical address
    thread_id = read_TCR; // get the thread ID
    switch(op)
    {
        case OP_OVERFLOW_READ:
            /* add address to in-memory permission table with
            read permission */
            insert_read_permission(address, thread_id);
            break;
        case OP_OVERFLOW_WRITE:
            /* add address and data to in-memory permission table
with write permission */
            insert_write_permission(address, data, thread_id);
            break;
        case OP_TRANS_READ:
            /* search the permission table to detect conflict */
            if (conflict) abort_one_transaction;
            else if (has_read_permission) do nothing;
            else if (has_write_permission) write the data into
            cache.
            else insert a new entry to lock table.
            break;
        case OP_TRANS_WRITE:
            data = read_TDR;
            /* search the permission table to detect conflict */
            if (conflict) abort_one_transaction;
            else if (has_read_permission) upgrade to write
            permission;
            else if (has_write_permission) write data to lock table
            entry;
            else insert a new entry to lock table.
```

```
            break;
    }
}
...
```

In step 203 of FIG. 2, a decision is made whether the barrier function is required to be executed. FIG. 4 depicts a specific judging or decision procedure to decide whether the barrier function is required to be executed according to embodiments of the present invention. First, it is judged whether data to be accessed by the main thread hits the cache, that is, it is judged whether the cache contains data to be accessed by the main thread. If it hits the cache, the main thread may access the cache directly without conflict, and thus the barrier function is not required. This procedure is similar to BET.

If it does not hit the cache, the main thread judges whether it hits write-signature itself when data is required to be written; and the main thread judges whether it hits read-signature and write-signature itself when data is required to be read. If it hits signature, it indicates that the current main thread accessed the data to be accessed. Thus, the current main thread may access the data without conflict. Here, the barrier function is not required.

Otherwise, there can be two cases. The first case is that it does not hit the cache and does not hit signature itself, i.e., it does not hit write-signature itself when data is required to be written; and it does not hit read-signature and write-signature itself when data is required to be read but hits signature of another the thread. For example, it hits read-signature and write-signature of the other thread when data is required to be written; and it hits write-signature of the other thread when data is required to be read. In the second case, it does not hit cache and does not hit signature, i.e., it does not hit any read-signature and write-signature when data is required to be written; and it does not hit any write-signature when data is required to be read.

The first case indicates that there may be another main thread accessing the data that is required to be accessed by the current main thread, i.e., there is a conflict. The second case indicates that there is no conflict between another main thread and the current main thread. These two cases both require executing the barrier function. If they do not require executing the barrier function, the main thread checks for conflict by means of a cache coherent protocol similar to BET. If they require executing the barrier function, the main thread requires communicating with the helper thread by utilizing registers as described above.

Figure 5:
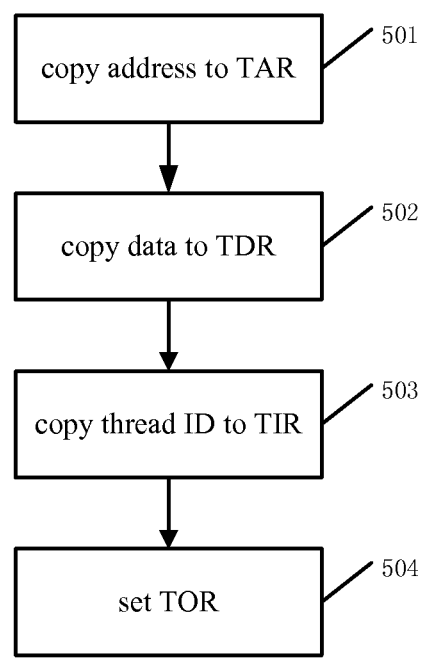
FIG. 5 depicts an example of a communication procedure for a main thread and a helper thread.

FIG. 5 depicts a specific communicating procedure for a main thread and a helper thread. First, the physical address of data that is required to be read or written by the transactional load or store is copied to TAR, step 501. If it is a transactional store, the data written by the transactional store is further copied to TDR, step 502. Next, the thread ID is copied to TIR, step 503. TOR is set to OP_TRANS_READ or OP_TRANS_WRITE as needed, step 504.

After TOR is set, the processor switches to the execution of the helper thread. If the barrier function is required, the barrier function is executed by the helper thread. The helper thread detects conflict by searching the lock table. Preferably, since the space of the cache is limited, the lock table may be stored in memory or may be stored in other storage devices that have enough space. During the procedure of detecting conflict according to the lock table, the function of the lock table is to contain the address or data information that is required to be read or written by the current transaction into the lock table to protect the filled address or data information. The utilization of a lock table is known in the art.

When the data is stored by using the cache, it is possible to have an overflow. When a transaction in the main thread overflows, an A-cache-line whose color-signature is the thread ID of the main thread is replaced out of the cache.

The cache controller does the following.

(1) Copy the physical address of this cache line to TAR.

(2) If the A-cache-line is in M state, copy the data in this A-cache-line to TDR.

(3) If the A-cache-line is in M state, add the physical address of this A-cache-line into the write-signature of SMT0; otherwise, add the physical address into the read-signature of SMT0.

(4) Copy the color-signature of A-cache-line to TIR.

(5) Invalidate this cache line.

(6) If the A-cache-line is in M state, set TOR to be OP_OVERFLOW_WRITE; otherwise, set TOR to be OP_OVERFLOW_READ.

(7) Finally, stall the main thread. This step is optional.

The specific ordering of the steps is not limited by the above list, and can be modified as needed.

During the procedure for checking conflict, if a conflict is detected, the helper thread can implement a contention management policy to abort the conflicted transaction. The process of aborting the conflicted transaction is quite flexible since the helper thread is a pure software thread.

If no conflict is detected, the helper thread does the following.

(1) TOR is OP_TRANS_READ
   (a) If the main thread already owns the read permission to the physical address of data to be read, the helper thread does nothing.
   (b) If the main thread has already owns the write permission to this address, the helper thread writes the data and the thread ID in this permission table into a cache line, and sets the A-flag. After that, flush the instructions from the main thread in SMT0.
   (c) If the helper thread finds no permission table entry corresponding to this address, it inserts a new entry into the lock table representing that the thread has the read permission.

(2) TOR is OP_TRANS_WRITE
   (a) If the main thread already owns the read permission to this address, the helper thread upgrades the read permission to write permission. Then the helper thread reads the memory block that contains the address from TAR by normal load operations, and records the block of data in the corresponding permission table entry. Finally, it updates the entry by writing the data from TDR to the entry and changing the permission flag.
   (b) If the main thread already owns the write permission to this address, the helper thread writes the data from TDR to the corresponding permission table entry.
   (c) If the helper thread finds no permission table entry corresponding to this address, it inserts a new entry into the lock table representing that the thread has the read permission.

When the helper thread finishes the operation of the barrier function, the helper thread exits and the main thread resumes. Thus, the switch from the helper thread to the main thread is completed.

As previously described, the transaction executed in the main thread may be committed and aborted. Transaction abortion is simple. The main thread executes a rollback instruction. The specific operation is as follows.

(1) It stalls the main thread.

(2) It sets TIR to be the thread ID.

(3) It sets TOR to be OP_ABORT.

(4) When the helper thread starts to run, it deletes all entries in the permission table that belongs to main threads.

After that, the main thread resumes. When the main thread resumes, it invalidates all corresponding A-cache-lines and clears the signature of SMT0. When the main thread commits the transaction, it does the following.

(1) It stalls the main thread.

(2) It sets TIR to be the thread ID.

(3) It sets TOR to be OP_COMMIT.

(4) When the helper thread starts to run, it writes the speculative data to the cache. After that, the main thread resumes. The instructions after the resume instruction clear all the A-flags in A-cache-lines belonging to the main thread and also clear the signature.

Moreover, in current processor systems, each core may have four threads. In embodiments of the present invention, only one may be used as a helper thread. Others can be used as main threads. The cost of the helper thread is not a problem. In future systems, many more processor cores and hardware threads can exist.

Figure 6:
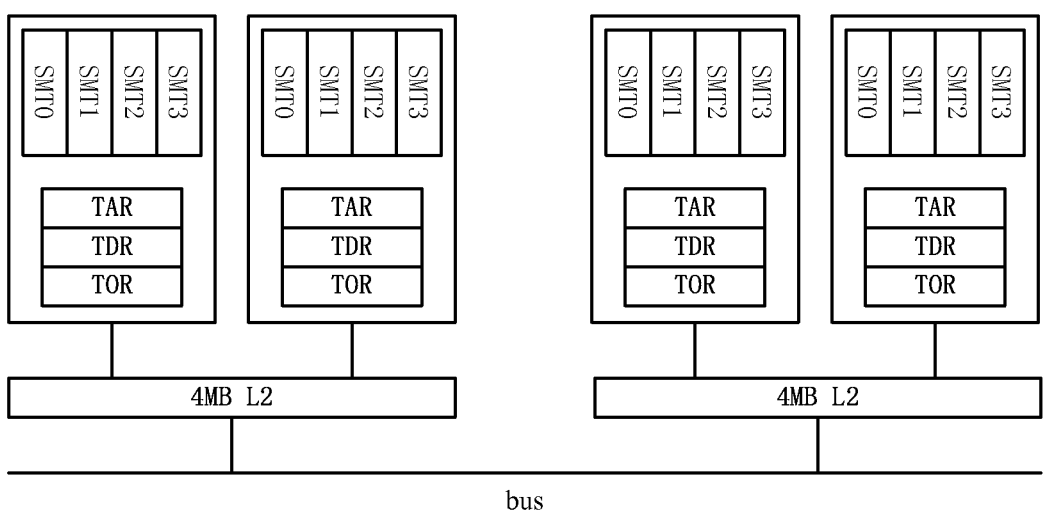
FIG. 6 depicts an example of a system of multiple processor cores and multiple threads.

FIG. 6 depicts an example of multiple processor cores and multiple threads. In this case, the same result can be achieved by using similar methods such as the interaction of two threads in the embodiment of the present invention in which multiple main threads interact with one helper thread.

Thus, the method and system for a transaction process provided according to the embodiments of the present invention can use the interaction among multiple hardware threads to achieve the barrier function in the case for which the barrier code is not required to be added, thereby avoiding difficulties resulting from re-compilation and assuring the detection of conflict during data access.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for executing a transaction by a processor apparatus that includes a plurality of hardware threads, the method comprising the steps of:
   creating a main software thread by the processor apparatus for executing the transaction;
   creating a helper software thread by the processor apparatus for executing a barrier function;
   executing the main software thread and the helper software thread by the processor apparatus using the plurality of hardware threads;
   deciding, by the processor apparatus, whether or not the barrier function is required to be executed when the main software thread encounters a transactional load or store operation that requires the main software thread to read or write data;
   executing the barrier function by the helper software thread, wherein the step of executing the barrier function includes: stalling the main software thread; activating the helper software thread to execute the barrier function; and exiting the helper software thread in response to the completion of the execution; and returning to the main software thread, thereby executing the transaction by the processor apparatus.

2. The method according to claim 1, wherein each of the plurality of hardware threads comprises write-signature for saving a physical address of data written or read-signature for saving a physical address of data read by the main software thread.

3. The method according to claim 2, wherein deciding whether the barrier function is required to be executed further comprises the step of:
requiring the barrier function to be executed if data to be read or written does not hit cache and data to be written does not hit the write-signature of the thread or data to be read does not hit the read-signature and write-signature of the thread.

4. The method according to claim 3, further comprising the step of:
communicating between the main software thread with the helper software thread by using share registers.

5. The method according to claim 4, wherein the share registers comprise:
a Transaction Address Register (TAR) for saving physical address of read or written data;
a Transaction Data Register (TDR) for saving data from a cache line in the cache;
a Transaction Operation Register (TOR) for saving a transaction operation code; and
a Transaction ID Register (TIR) for saving a hardware thread ID that sets TOR.

6. The method according to claim 5, wherein the step of communicating by using share registers further comprises:
copying physical address of data to be read/written to the TAR;
copying data to be written to the TDR;
copying the hardware thread ID to the TIR; and
setting the state of the TOR according to the state to be read/written.

7. The method according to claim 1, further comprising:
searching a lock table by the helper software thread to detect if there is a conflict.

8. The method according to claim 1 further comprising the step of communicating between the main software thread with the helper software thread by using share registers, wherein the share registers comprise a Transaction Operation Register (TOR) for saving a transaction operation code and a Transaction ID Register (TIR) for saving a hardware thread ID that sets TOR.

9. The method according to claim 7, further comprising:
aborting the transaction by the helper software thread when a conflict is detected.

10. The method according to claim 7, further comprising:
terminating the helper software thread when the main software thread owns read permission to the physical address of data to be read.

11. The method according to claim 7, further comprising:
inserting a new entry into the lock table by the helper software thread representing that the main software thread has read permission if the helper software thread finds no entry corresponding to the physical address of data to be read in the lock table.

12. The method according to claim 7, further comprising:
inserting a new entry into the lock table by the helper software thread representing that the main software thread has write permission if the helper software thread finds no entry corresponding to the physical address of data to be written in the lock table.

13. A system for executing a transaction by a processor apparatus that includes a plurality of simultaneous hardware threads, comprising:
means for creating a main software thread for executing the transactions;
means for creating a helper software thread for executing a barrier function;
means for executing the main software thread and the helper software thread by utilizing the plurality of hardware threads;
means for deciding whether or not the barrier function is required to be executed when the main software thread encounters a transactional load or store operation that requires the main software thread to read or write data;
means for executing the barrier function by the helper software thread, wherein the means for executing the barrier function includes: means for stalling the main software thread; means for activating the helper software thread to execute the barrier function; and means for exiting the helper software thread in response to the completion of the barrier function by the helper software thread; and
means for returning to the main software thread.

14. The system according to claim 13, each of the plurality of hardware threads further comprises write-signature and read-signature for saving a physical address of data read or written by the main software thread.

15. The system according to claim 14, further comprising:
means for requiring the barrier function to be executed if: (i) data to be read or written does not hit cache; (ii) data to be written does not hit the write-signature of the thread; or (iii) data to be read does not hit the read-signature and write-signature of the thread.

16. The system according to claim 15, further comprising:
a plurality of share registers for communicating between the main software thread with the helper software thread.

17. The system according to claim 16, wherein the plurality of share registers comprise:
a Transaction Address Register (TAR) for a saving physical address of read or written data;
a Transaction Data Register (TDR) for saving data from a cache line in the cache;
a Transaction Operation Register (TOR) for saving a transaction operation code; and
a Transaction ID Register (TIR) for saving a hardware thread ID that sets TOR.

18. The system according to claim 13, further comprising:
a lock table for searching by the helper software thread to detect conflict.

19. The system according to claim 13, further comprising a a plurality of share registers for communicating between the main software thread with the helper software thread, wherein the plurality of share registers comprise a Transaction Operation Register (TOR) for saving a transaction operation code and a Transaction ID Register (TIR) for saving a hardware thread ID that sets TOR.

20. A non-transitory computer readable article of manufacture tangibly embodying computer readable instructions stored thereon which, when executed, cause a computing apparatus to implement a method for executing a transaction by a processor apparatus that includes a plurality of hardware threads, the method comprising the steps of
creating a main software thread by the processor apparatus for executing the transaction;
creating a helper software thread by the processor apparatus for executing a barrier function;

executing the main software thread and the helper software thread by the processor apparatus using the plurality of hardware threads;

deciding, by the processor apparatus, whether or not the barrier function is required to be executed when the main software thread encounters a transactional load or store operation that requires the main software thread to read or write data;

executing the barrier function by the helper software thread, wherein the step of executing the barrier function includes: stalling the main software thread; activating the helper software thread to execute the barrier function; and exiting the helper software thread in response to the completion of the execution; and returning to the main software thread.

* * * * *